United States Patent [19]
Cook

[11] 3,977,662
[45] Aug. 31, 1976

[54] FURNITURE UPHOLSTERY STAND

[76] Inventor: Herbert B. Cook, 719 E. Southcross, San Antonio, Tex. 78214

[22] Filed: Aug. 25, 1975

[21] Appl. No.: 607,366

[52] U.S. Cl. .................................. 269/60; 269/71; 269/104; 269/152; 269/244
[51] Int. Cl.² .......................................... B25B 1/10
[58] Field of Search ............... 269/60, 61, 71, 104, 269/152, 153, 172, 221, 240, 244, 245, 246

[56] References Cited
UNITED STATES PATENTS

| | | | |
|---|---|---|---|
| 1,812,585 | 6/1931 | Collins | 269/61 |
| 1,823,204 | 9/1931 | Long | 269/61 |
| 1,834,294 | 12/1931 | Spahn | 269/152 |
| 2,188,433 | 1/1940 | Friese | 269/71 |
| 2,536,239 | 1/1951 | Tyndall | 269/152 |
| 3,218,056 | 11/1965 | Kaplan et al | 269/61 |
| 3,643,935 | 2/1972 | Bell | 269/152 |
| 3,827,682 | 8/1974 | Foster et al | 269/71 |

FOREIGN PATENTS OR APPLICATIONS

| | | | |
|---|---|---|---|
| 827,923 | 1/1952 | Germany | 269/153 |

Primary Examiner—Al Lawrence Smith
Assistant Examiner—Robert C. Watson
Attorney, Agent, or Firm—John C. Stahl

[57] ABSTRACT

A furniture upholstery stand comprising coacting first and second support members each including a transversely extending member rotatably mounted thereon, first and second coacting sleeves slidably mounted on each transversely extending member, means adapted to secure furniture intermediate said coacting sleeves, and means adapted to balance the weight of the furniture on said stand.

2 Claims, 5 Drawing Figures

U.S. Patent   Aug. 31, 1976   3,977,662
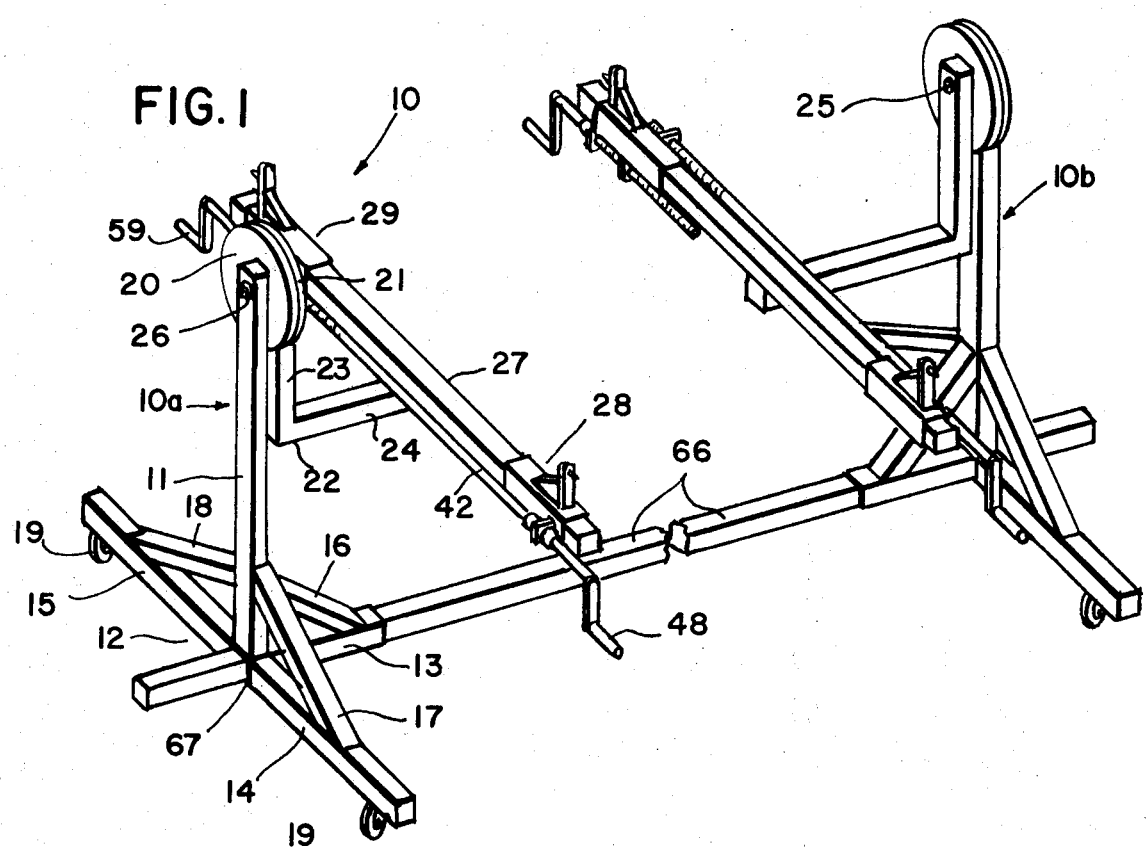
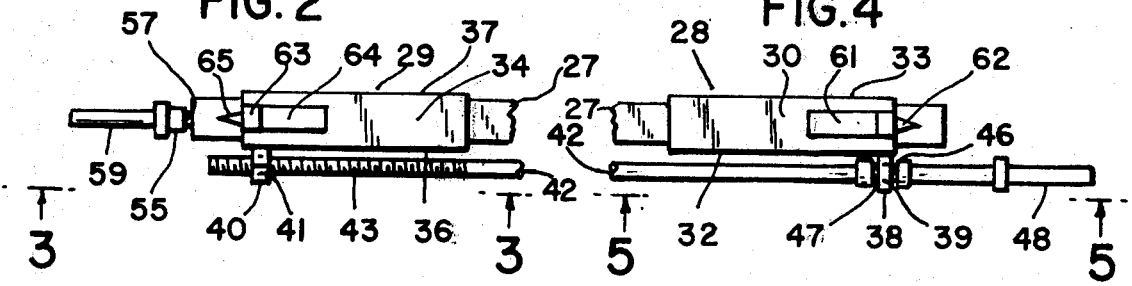
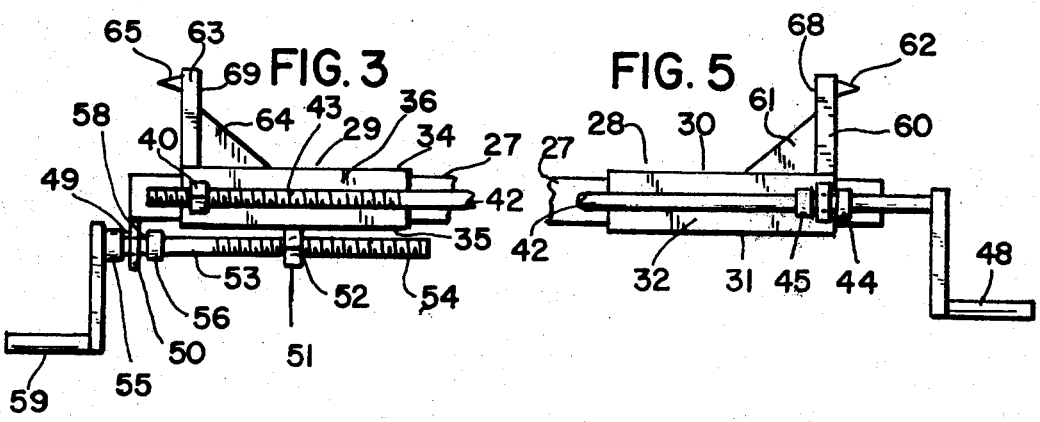

FURNITURE UPHOLSTERY STAND

BACKGROUND OF THE INVENTION

Heretofore in the upholstering and repair of furniture such as sofas, hide-a-beds and overstuffed chairs, it has been the general practice to place a selected piece of furniture of such type upon a work table or bench. Obviously such supporting structure does not provide access to the lower frame and the upholsterer must often kneel for extended periods of time or move about on his knees to work on such portions. Additionally, such furniture is relatively heavy and awkward to handle and the placing thereof in convenient positions is quite a laborous operation and requires considerable time and energy.

SUMMARY OF THE INVENTION

It is therefore the primary object of the invention to provide an upholstery stand for holding furniture undergoing upholstery or repair at a convenient height, wherein said furniture may be rotated about its longitudinal axis to any selected angle to facilitate work on various portions thereof.

Another object is to provide an upholstery stand which is easily balanced, easily rotated to different angles, and easily locked in position at a desired angle.

Still another object is to provide such a stand which is durable, extremely simple in operation, and universal in its applicability.

Other objects and features of the invention will become apparent to those skilled in the art from a consideration of the following specification when read in the light of the annexed drawings.

BRIEF DESCRIPTION OF THE DRAWINGS

FIG. 1 is a perspective view of the furniture upholstery stand of the subject invention.

FIG. 2 is a fragmentary, enlarged, top plan view of an adjustable rear sleeve of the subject invention.

FIG. 3 is a side elevational view, taken on the line 3—3 of FIG. 2, looking in the direction of the arrows.

FIG. 4 is a fragmentary, enlarged, top plan view of an adjustable front sleeve of the subject invention.

FIG. 5 is a side elevational view, taken on the line 5—5 of FIG. 4, looking in the direction of the arrows.

DETAILED DESCRIPTION OF INVENTION

Referring now to the drawings, wherein like reference characters designate like or corresponding parts throughout the several views, there is shown in FIG. 1 a preferred embodiment of furniture upholstery stand 10 of the subject invention which comprises opposing and coacting support members 10a–10b. For purposes of convenience only, support member 10a will be described in detail; it is understood that support member 10b is similar in construction and essentially a mirror image thereto. Support member 10a includes vertically extending standard 11 secured downwardly to base 12 which in one embodiment of the invention comprises longitudinally and horizontally extending tubular member 13 and transversely extending members 14–15, said members 13–15 preferably lying in the same horizontal plane. The lower end of standard 11 is secured as by welding or the like to the upper surface of member 13 at least slightly inward of the outer end thereof or the outer wall of said standard may be vertically aligned with the outer end of said member. The inner ends of members 14,15 are fixedly secured to the opposing sides of member 13 with the major axes of said members 14,15 preferably lying in the same vertical plane and also transversely aligned with said standard.

Angularly extending braces 16–18 are fixedly secured downwardly to selected portions of members 13–15, respectively; said braces are fixedly secured upwardly to selected portions of said standard. Rollers 19 or the like are conventionally mounted in proximity to the outer ends of members 14,15. Disc 20 of metallic composition and of desired diameter is fixedly secured to the inner surface of standard 11, said standard extends diagonally across said disc and desirably terminates above the center thereof.

Disc 21, of metallic composition and corresponding in diameter to disc 20, is rotatably mounted on disc 20. More particularly, L-shaped member 22 includes leg 23, substantially greater in length than the diameter of disc 21, and leg 24 which extends perpendicularly inward. Leg 23 extends diagonally across the innermost surface of disc 21 and is fixedly secured thereto with the free end of said leg desirably extending beyond the center of said disc. A longitudinally and horizontally extending bore (not shown) is provided through the upper portion of standard 11, the centers of discs 20,21 and the upper portion of leg 23, respectively; bolt 25 is passed outwardly through said bore with nut 26 threaded thereon outwardly of said standard.

Transversely extending member 27, preferably square in cross section, is approximately centered with respect to leg 24 and fixedly secured to the upper surface of said leg in proximity to the innermost end thereof. As best seen in FIGS. 2–5 of the drawings, coacting sleeves 28–29 are slidably mounted in spaced relationship on member 27. More particularly, sleeve 28 includes top 30, bottom 31, and opposing sides 32–33; sleeve 29 includes top 34, bottom 35, and opposing sides 36–37, respectively. Perpendicularly extending lug 38, fixedly secured or integrally formed on side 32 of sleeve 28, includes a transversely extending bore 39 passing therethrough, while perpendicularly extending lug 40 on side 36 of sleeve 29 includes transversely extending female threads 41 passing therethrough. Rod 42, passing through bore 39 in lug 38, includes standard threads 43 at least adjacent the rearmost end thereof which are adapted to mate with female threads 41 in lug 40. Collars 44–45 are fixedly secured to rod 42 with ends 46–47, respectively, slightly spaced from the adjacent sides of lug 38. Handle 48 is fixedly secured to the foremost end of said rod.

As best seen in FIGS. 2 and 3 of the drawings, downwardly depending lug 49, including a transversely extending bore 50 passing therethrough, is fixedly secured or integrally formed on the bottom of member 27 in proximity to the rear end thereof. Downwardly depending lug 51, including transversely extending female threads 52 passing therethrough, is provided on bottom 35 of sleeve 29 along the approximate medial plane thereof. Rod 53, passing through bore 50 in lug 49, includes standard threads 54 at least in proximity to the foremost end thereof which are adapted to mate with female threads 52 in lug 51. Collars 55–56 are fixedly secured on rod 53 with ends 57–58, respectively, slightly spaced from the adjacent sides of lug 49. Handle 59 is fixedly secured to the rearmost end of rod 53.

Vertically extending bar 60, fixedly secured to top 30 in proximity to the front end of sleeve 28, desirably includes a reinforcing gusset 61 or the like; an outwardly extending pin 62 is fixedly secured in proximity to the upper end of said bar. In like manner, bar 63, gusset 64, and outwardly extending pin 65 are provided on sleeve 29. Elongated rod 66 is passed through bore 67 of tubular member 13 and the corresponding bore in the tubular member on support member 10b whereby said support members 10a, 10b may be separated any desired distance. Set screws (not shown) or other securing means carried in or coacting with tubular member 13 may be adjusted to secure rod 66 in a selected position relative to members 10a, 10b.

It is evident that such construction permits sleeve 28 to be moved in a desired direction on member 27 relative to sleeve 29 by rotating handle 48. Additionally, after a load is secured to sleeves 28,29 in a manner hereinafter to be described in detail, said connected sleeves may be moved either forwardly or rearwardly a desired distance on member 27 by means of handle 59 to balance or equalize the weight of said load on said stand.

It is well known that upholstered furniture such as sofas, hide-a-beds, overstuffed chairs and the like include a lower frame comprising front and back rails, generally composed of wood. A selected piece of upholstered furniture of the type heretofore mentioned is positioned upon transversely extending member 27 and the corresponding member on support member 10b with bar 63 on sleeve 29 positioned inwardly of the back rail of said furniture; pin 65 is then at least partially inserted into the inner surface of said back rail. Rotation of handle 48 in a counterclockwise direction causes end 47 of collar 45 to bear against the adjacent surface of lug 38 and sleeve 28 is driven forwardly until pin 62 penetrates the inner surface of the front rail, at which time said furniture is secured to said stand. Handle 59 may then be rotated in such a direction that the furniture is moved in a desired direction on member 27 to balance the load whereby said furniture is more easily rotated about its longitudinal axis and the user has access to any selected portion of said furniture for upholstering or other repair. More specifically, rotation of handle 59 in a clockwise direction causes end 57 of collar 55 to bear against the adjacent side of lug 49 and the connected sleeves 28,29 with the furniture secured thereto is moved forwardly. Upon rotation of said handle in a counterclokwise direction, end 58 of collar 56 abuts the adjacent side of lug 49 and the connected sleeves 28,29 with the furniture secured thereto is moved rearwardly. The furniture secured to said stand may then be rotated about its longitudinal axis to any desired angle and secured in such position by tightening nut 26 or placing a clamp or the like outwardly of discs 20,21 and tightening the same thereby preventing rotation of said discs.

Rotation of handle 48 in a clockwise direction causes end 46 of collar 44 to abut the adjacent side of lug 38 and sleeve 28 is driven rearwardly; at such time pin 62 is retracted from the front rail. The furniture may then be moved rearwardly thereby disengaging pin 65 from the back rail and said furniture may then be removed from the stand.

As best seen in FIGS. 3 and 5 of the drawings, flats 66–67 are provided on the uppermost, inner sides of bars 60,63 respectively. To replace the backing or fabric normally secured to the lower frame members, flats 66,67 are adapted to bear against selected portions of the outer surfaces of said front and back rails whereby said furniture may be secured to said stand. The furniture may then be rotated approximately 180° whereby said backing is conventionally secured to said lower frame members.

It should be understood, of course, that the foregoing disclosure relates to only preferred embodiments of the invention and that numerous modifications or alterations may be made therein without departing from the spirit and scope of the invention as set forth in the appended claims.

I claim:

1. A furniture upholstery stand comprising first and second coacting support members, each support member comprising a standard, said standard secured downwardly to a base, a first disc fixedly secured to said standard, a second disc rotatably mounted on said first disc, a transversely extending member secured to said second disc, first and second coacting sleeves slidably mounted on each transversely extending member, means on said first and second sleeves adapted to secure said furniture to said stand, means to adjust said first sleeve relative to said second sleeve, and means to adjust said second sleeve and said first sleeve remotely connected thereto on said transversely extending member to balance the weight of said furniture on said stand, said means to adjust said first sleeve relative to said second sleeve comprising a first rod including first and second ends, said first rod provided with threads at least adjacent said second end, a first lug on said first sleeve, a transversely extending bore in said first lug, a second lug on said second sleeve, transversely extending female threads in said second lug, said first rod passed through said bore in said first lug and threaded into said female threads in said second lug, first and second collars carried on said first rod in spaced relation to opposing sides of said first lug whereby rotation of said first rod in one direction causes said first collar to bear against said first lug and said first sleeve is driven in one direction relative to said second sleeve and rotation of said first rod in the opposite direction causes said second collar to bear against said first lug and said first sleeve is driven in the opposite direction relative to said second sleeve.

2. The invention of claim 1 wherein said means to adjust said second sleeve and said first sleeve remotely connected thereto on said transversely extending member to balance the weight of said furniture on said stand comprises a second rod including first and second ends, said second rod provided with threads at least adjacent said second end, a third lug on said transversely extending member, a transversely extending bore in said third lug, a fourth lug on said second sleeve, transversely extending female threads in said fourth lug, said second rod passed through said bore in said third lug and threaded into said female threads in said fourth lug, third and fourth collars carried on said second rod in spaced relation to opposing sides of said third lug whereby rotation of said second rod in one direction causes said third collar to bear against said third lug and said second sleeve and said first sleeve remotely connected thereto are driven in one direction and rotation of said second rod in the opposite direction causes said fourth collar to bear against said third lug and said second sleeve and said first sleeve remotely connected thereto are driven in the opposite direction on said transversely extending member.

* * * * *